United States Patent
Zeng et al.

(10) Patent No.: US 12,394,861 B2
(45) Date of Patent: Aug. 19, 2025

(54) BATTERY AND RELATED APPARATUS, PRODUCTION METHOD AND PRODUCTION DEVICE THEREFOR

(71) Applicant: CONTEMPORARY AMPEREX TECHNOLOGY (HONG KONG) LIMITED, Hong Kong (CN)

(72) Inventors: Yuqun Zeng, Fujian (CN); Xiaobo Chen, Fujian (CN); Peng Wang, Fujian (CN); Yao Li, Fujian (CN); Chengdu Liang, Fujian (CN); Yongshou Lin, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 1291 days.

(21) Appl. No.: 17/113,067

(22) Filed: Dec. 6, 2020

(65) Prior Publication Data

US 2022/0013856 A1 Jan. 13, 2022

Related U.S. Application Data

(63) Continuation of application No. PCT/CN2020/101442, filed on Jul. 10, 2020.

(51) Int. Cl.
*H01M 50/342* (2021.01)
*H01M 10/04* (2006.01)
(Continued)

(52) U.S. Cl.
CPC ... *H01M 50/3425* (2021.01); *H01M 10/0404* (2013.01); *H01M 10/0525* (2013.01);
(Continued)

(58) Field of Classification Search
None
See application file for complete search history.

(56) References Cited

U.S. PATENT DOCUMENTS 5,158,841 A * 10/1992 Mennicke ............ H01M 10/615
220/592.2
2009/0220850 A1 9/2009 Bitsche et al.
(Continued)

FOREIGN PATENT DOCUMENTS

CN 102598358 A 7/2012
CN 103123996 A 5/2013
(Continued)

OTHER PUBLICATIONS

Notification to Grant Patent Right for Invention dated Dec. 1, 2023 received in Chinese Patent Application No. CN 202080005971.9.
(Continued)

*Primary Examiner* — Maria Laios
(74) *Attorney, Agent, or Firm* — Scully, Scott, Murphy & Presser, P.C.

(57) ABSTRACT

The present application discloses a battery including a battery cell, a thermal management component, an avoidance chamber and a collection chamber. The battery cell includes a pressure relief mechanism; the thermal management component is configured to adjust a temperature of the battery cell; the avoidance chamber is configured to provide a space allowing the pressure relief mechanism to be actuated; and the collection chamber is configured to collect emissions from the battery cell when the pressure relief mechanism is actuated. The thermal management component is configured such that emissions are capable of passing through the thermal management component when the pressure relief mechanism is actuated, and then entering the collection chamber through the avoidance chamber. Therefore, the pressure relief mechanism may not need to be (Continued)

provided on a side of an electrode terminal of the battery cell and emissions relieved by the pressure relief mechanism may be collected.

18 Claims, 7 Drawing Sheets

(51) Int. Cl.
    *H01M 10/0525* (2010.01)
    *H01M 10/625* (2014.01)
    *H01M 10/6556* (2014.01)

(52) U.S. Cl.
    CPC ..... *H01M 10/625* (2015.04); *H01M 10/6556* (2015.04); *H01M 2200/10* (2013.01); *H01M 2200/20* (2013.01); *H01M 2220/20* (2013.01)

(56) References Cited

U.S. PATENT DOCUMENTS

| | | |
|---|---|---|
| 2010/0323228 A1 | 12/2010 | Okamoto et al. |
| 2013/0059175 A1 | 3/2013 | Engel et al. |
| 2017/0149103 A1 | 5/2017 | Yang et al. |
| 2019/0229384 A1* | 7/2019 | Tasiopoulos ...... H01M 10/6554 |
| 2020/0185798 A1 | 6/2020 | Ing et al. |
| 2021/0036285 A1 | 2/2021 | Huang et al. |

FOREIGN PATENT DOCUMENTS

| | | |
|---|---|---|
| CN | 207233830 U | 4/2018 |
| CN | 110061329 A | 7/2019 |
| CN | 209104196 U | 7/2019 |
| CN | 209401662 U | 9/2019 |
| CN | 110400895 A | 11/2019 |
| CN | 111106277 A | 5/2020 |
| CN | 111106281 A | 5/2020 |
| CN | 213636145 U | 7/2021 |
| DE | 102017212223 A1 | 1/2019 |
| JP | 2007027011 A | 2/2007 |
| JP | 2013509688 A | 3/2013 |
| JP | 2015-018706 A | 1/2015 |
| JP | 7321300 B2 | 8/2023 |
| KR | 20190089121 A | 7/2019 |
| RU | 60792 U1 | 1/2007 |
| RU | 2675595 C1 | 12/2018 |
| RU | 186666 U1 | 1/2019 |
| WO | 2013006121 A1 | 1/2013 |

OTHER PUBLICATIONS

Notice of Reasons for Refusal dated Jan. 16, 2023 received in Japanese Patent Application No. JP 2021-576685.
Extended European Search Report dated May 2, 2023 received in European Patent Application No. EP 23155046.8.
Decision to Grant a Patent for Invention dated May 10, 2023 received in Russian Patent Application No. RU 2023102374.
First Office Action dated Sep. 4, 2023 received in Chinese Patent Application No. CN 202080005971.9.
Notice of Reasons for Refusal dated Jun. 17, 2024 received in Japanese Patent Application No. 2023-117747.
Notice of Allowance dated Jul. 2, 2024 received in Korean Patent Application No. KR 10-2021-7042847.

* cited by examiner

BATTERY AND RELATED APPARATUS, PRODUCTION METHOD AND PRODUCTION DEVICE THEREFOR

CROSS-REFERENCE TO RELATED APPLICATIONS

This application is a continuation of International Application No. PCT/CN2020/101442, filed on Jul. 10, 2020, which is hereby incorporated by reference in its entirety.

TECHNICAL FIELD

The present application relates to the field of batteries, and in particular, to a battery and a related apparatus, production method and production device therefor.

BACKGROUND

A chemical battery, electrochemical battery, or electrochemical cell refers to a type of apparatus that converts chemical energy of positive and negative electrode active materials into electric energy through a redox reaction. Unlike an ordinary redox reaction, oxidation and reduction reactions are carried out separately, with the oxidation reaction taking place at a negative electrode and the reduction reaction taking place at a positive electrode, and gain and loss of electrons are carried out through an external circuit, and thus a current is formed. This is an essential characteristic of all batteries. After long-term research and development, the chemical battery has ushered in a situation of great varieties and wide applications, for example, it may be a huge device that can fit in a building, or a small device in millimeter. With the development of modern electronic technology, high requirements are put forward for the chemical battery. Every breakthrough in chemical battery technology brings revolutionary development of an electronic device. Many electrochemical scientists in the world have focused their research and development interests in the field of chemical batteries that power electric automobiles.

As a kind of chemical battery, a lithium-ion battery has advantages of small size, high energy density, high power density, multiple cycle times, long storage time, and the like, and has been widely applied in some electronic devices, electric vehicles, electric toys and electric devices. For example, currently, the lithium-ion battery is widely applied in mobile phones, notebook computers, electromobiles, electric automobiles, electric airplanes, electric ships, electric toy cars, electric toy ships, electric toy airplanes, electric tools, or the like.

With the continuous development of lithium-ion battery technology, higher requirements are put forward for performance of the lithium-ion battery. It is hoped that design factors in multiple aspects can be simultaneously considered for the lithium-ion battery, and safety performance of the lithium-ion battery is particularly important.

SUMMARY

The present application provides a battery and a related apparatus, production method and production device therefor to improve performance of a secondary battery.

According to a first aspect of the present application, a battery is provided, including a battery cell, a thermal management component, an avoidance chamber and a collection chamber. The battery cell includes a pressure relief mechanism, the pressure relief mechanism being configured to be actuated when an internal pressure or temperature of the battery cell reaches a threshold, to relieve the internal pressure; the thermal management component is configured to accommodate a fluid to adjust a temperature of the battery cell; the avoidance chamber is formed between the pressure relief mechanism and the thermal management component, the avoidance chamber being configured to provide a space allowing the pressure relief mechanism to be actuated; and the collection chamber is located on an outer side of the avoidance chamber for collecting emissions from the battery cell when the pressure relief mechanism is actuated. The thermal management component is configured such that emissions of the battery cell are capable of passing through the thermal management component when the pressure relief mechanism is actuated, and then entering the collection chamber through the avoidance chamber.

According to the present solution, provision of the avoidance chamber could leave a certain space for actuation of the pressure relief mechanism. Therefore, due to the provision of the avoidance chamber, the pressure relief mechanism may do not need to be provided on a side of an electrode terminal of the battery cell, and may be selectively provided on another side of the battery cell; and provision of the collection chamber could allow emissions relieved by the pressure relief mechanism to be collected without being sprayed or flowing to the outside, thereby not causing pollution to other components or the external environment. The solution provided in the present application could achieve that the emissions of the battery cell can be effectively discharged in a case that thermal runaway occurs inside the battery, thereby reducing a risk caused by poor discharge of the emissions. Moreover, the present application provides a variety of possibilities for the setting of the battery, which is especially helpful to further optimizing various settings of the battery and various settings related to the pressure relief mechanism.

In one implementation manner, the thermal management component is provided with a through hole, and the through hole is configured such that the avoidance chamber and the collection chamber are in communication with each other.

According to the present solution, the emissions at a relief site of the battery cell can enter the collection chamber from the avoidance chamber through a through hole. This process can be achieved without damaging the thermal management component, which could facilitate collection of the emissions and avoid accumulation of excessive emissions in the avoidance chamber.

In one implementation manner, the avoidance chamber is formed from the through hole provided on the thermal management component, so that the emissions from the battery cell are capable of directly entering the collection chamber through the through hole when the pressure relief mechanism is actuated.

According to the present solution, the avoidance chamber is formed from the through hole on the thermal management component. This arrangement may make a gap between bottom walls of the battery cell and the thermal management component smaller, so that a volume of the battery could be as small as possible and a structure of the battery is relatively compact.

In one implementation manner, the thermal management component is provided between the avoidance chamber and the collection chamber and isolates the avoidance chamber and the collection chamber from each other, and the thermal management component is configured to be capable of being damaged by the emissions of the battery cell, so that the emissions of the battery cell enter the collection chamber from the avoidance chamber.

According to the present solution, the emissions needs to break through the thermal management component to enter the collection chamber. This arrangement could reduce a final impact force of the emissions to the outside and reduce potential danger to the outside.

In one implementation manner, the thermal management component is internally provided with a flow channel for fluid flow, where the avoidance chamber is configured to be surrounded by the flow channel.

In one implementation manner, the flow channel is configured to remain intact in a process of the emissions of the battery cell flowing through the thermal management component.

According to the foregoing two solutions, the fluid can adjust the temperature of the battery cell during the use of the battery, which avoids actuating the pressure relief mechanism due to overheating of the battery cell.

In one implementation manner, the thermal management component is configured such that the emissions of the battery cell are capable of damaging a wall of the flow channel, so that the flow channel is in communication with the avoidance chamber.

According to the present solution, the fluid can be released and then enter the collection chamber together with the emissions of the battery cell. The mixing of the fluid and the emissions of the battery cell could accelerate cooling of the emissions of the battery cell.

In one implementation manner, the avoidance chamber is formed from an avoidance structure of the thermal management component that is open toward the pressure relief mechanism, and the avoidance structure includes an avoidance side wall surrounding the avoidance chamber.

According to the present solution, the avoidance structure is formed as one concave chamber on the thermal management component. This arrangement could avoid provision of an extra space and make the structure of the battery more compact.

In one implementation manner, the avoidance chamber is formed from an avoidance structure of the thermal management component that is open toward the pressure relief mechanism, the avoidance structure includes an avoidance side wall surrounding the avoidance chamber, and the avoidance side wall is configured to be damaged when the pressure relief mechanism is actuated, so that the fluid flows out.

In one implementation manner, the avoidance side wall is at a predetermined included angle relative to a direction of the pressure relief mechanism toward the thermal management component, and the predetermined included angle is greater than or equal to 15° and less than or equal to 85°.

According to the foregoing two solutions, the avoidance structure is formed as one concave chamber on the thermal management component. This arrangement could avoid provision of an extra space and make the structure of the battery more compact. Moreover, provision of the avoidance side wall can make it easier for the flow channel to be broken by the emissions of the battery cell.

In one implementation manner, the thermal management component is provided with a relief mechanism opposite to the avoidance chamber, and the relief mechanism is configured to be capable of being actuated to release emissions in the avoidance chamber to the collection chamber.

In one implementation manner, the relief mechanism is configured to be actuated when an internal pressure or temperature in the avoidance chamber reaches a threshold.

In one implementation manner, the relief mechanism is configured to be actuated when a temperature of the emissions in the avoidance chamber reaches a threshold.

In one implementation manner, the relief mechanism includes a weakened structure formed on a wall of the thermal management component.

According to the foregoing several solutions, a relief mechanism may be provided on the thermal management component according to needs, and when it is actuated, the emissions in the avoidance chamber can be relieved to the collection chamber. This arrangement could not only facilitate relief of the emissions in the avoidance chamber and avoid great pressure or high temperature in the avoidance chamber, but also weaken an impact force of the emissions to a certain extent and avoid danger to other components or the external environment caused by the emissions with a still huge impulse finally.

In one implementation manner, the battery includes a case shell configured to accommodate the battery cell, and the thermal management component constitutes at least a portion of the case shell.

According to the present solution, the thermal management component directly serves as a portion of the case shell, which may reduce the volume of the battery and make the structure of the battery more compact.

In one implementation manner, the battery further includes a protective member, and the collection chamber is defined between the thermal management component and the protective member.

According to the present solution, provision of the protective member could further ensure integrality and safety of the battery. Meanwhile, the collection chamber may be defined by the thermal management component and the protective member, which increases flexibility of the arrangement of the collection chamber.

In one implementation manner, the protective member includes a concave chamber having an opening toward the thermal management component to form the collection chamber.

In one implementation manner, a sealing member is placed between the protective member and the thermal management component, and the protective member and the thermal management component are firmly engaged by a fastener.

According to the foregoing two solutions, a structure of the protective member and an engagement manner of the protective member and the thermal management component may be selected in various ways according to needs.

In one implementation manner, the sealing member is configured to be damaged when a temperature of the emissions reaches a predetermined temperature, so as to relieve pressure in the collection chamber.

According to the present solution, when the pressure or temperature in the avoidance chamber is too great or high and the pressure or temperature in the collection chamber is too great or high, emissions in the collection chamber may be further relieved to the outside, thereby avoiding causing danger.

According to a second aspect of the present application, an apparatus is provided, including the battery according to any one of the foregoing solutions, the battery being configured to provide electric energy.

According to a third aspect of the present application, a method for producing a battery is provided, including:

providing a battery cell, the batter cell including a pressure relief mechanism, the pressure relief mechanism being configured to actuated when an internal pressure or temperature of the battery cell reaches a threshold, to relieve the internal pressure; providing a thermal management component, the thermal management component being configured to accommodate a fluid to adjust a temperature of the battery cell; providing an avoidance chamber, the avoidance chamber being formed between the pressure relief mechanism and the thermal management component, and the avoidance chamber being configured to provide a space allowing the pressure relief mechanism to be actuated; and providing a collection chamber, the collection chamber being located on an outer side of the avoidance chamber for collecting emissions from the battery cell when the pressure relief mechanism is actuated. The thermal management component is configured such that emissions of the battery cell are capable of passing through the thermal management component when the pressure relief mechanism is actuated, and then entering the collection chamber through the avoidance chamber.

According to a fourth aspect of the present application, a device for producing a battery is provided, including: a battery cell production module configured to produce a plurality of battery cells, at least one battery cell of the plurality of battery cells including a pressure relief mechanism, the pressure relief mechanism being configured to be actuated when an internal pressure or temperature of the at least one battery cell reaches a threshold, to relieve the internal pressure; a thermal management component production module configured to produce a thermal management component, the thermal management component being configured to accommodate a fluid to adjust a temperature of the battery cell; an avoidance chamber formation module configured to form an avoidance chamber, the avoidance chamber being formed between the pressure relief mechanism and the thermal management component, and the avoidance chamber being configured to provide a space allowing the pressure relief mechanism to be actuated; and a collection chamber formation module configured to form a collection chamber, the collection chamber being located on an outer side of the avoidance chamber for collecting emissions from the battery cell when the pressure relief mechanism is actuated. The thermal management component is configured such that emissions of the battery cell are capable of passing through the thermal management component when the pressure relief mechanism is actuated, and then entering the collection chamber through the avoidance chamber.

According to a battery and a related apparatus, production method and production device therefor of embodiments of the present application, a pressure relief mechanism is provided on a battery cell, and an avoidance chamber and a connection chamber are provided on an outer side of the battery cell. Provision of the avoidance chamber could leave a certain space for actuation of the pressure relief mechanism. Therefore, due to the provision of the avoidance chamber, the pressure relief mechanism may do not need to be provided on a side of an electrode terminal of the battery cell, and may be selectively provided on another side of the battery cell; and provision of the collection chamber could allow emissions relieved by the pressure relief mechanism to be collected without being sprayed or flowing to the outside, thereby not causing pollution to other components or the external environment. The solutions provided in the present application could provide a variety of possibilities for the setting of the battery, which is especially helpful to further optimizing various settings of the battery and various settings related to the pressure relief mechanism, thereby improving comprehensive performance of the battery.

BRIEF DESCRIPTION OF DRAWINGS

The accompanying drawings described herein are intended to provide a further understanding of the present application and constitute a part of the present application. The illustrative embodiments of the present application and the description thereof are for explaining the present application and do not constitute an undue limitation to the present application. In the drawings.

DESCRIPTION OF EMBODIMENTS

Figure 1:
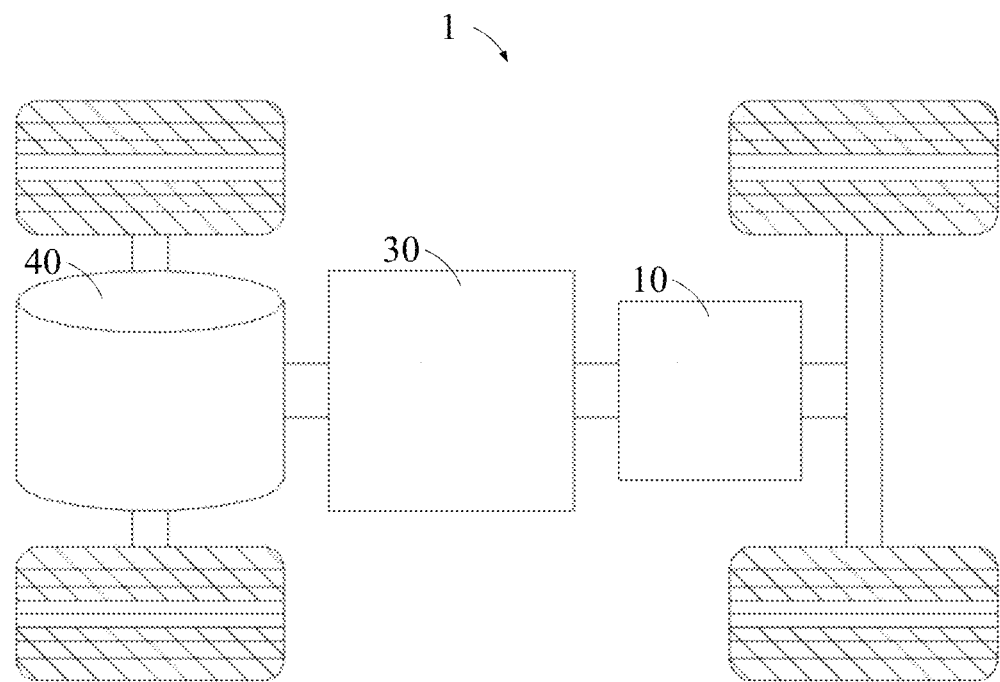
FIG. 1 shows a schematic structural diagram of some embodiments of a vehicle using a battery of the present application.

To make the objectives, technical solutions and advantages of the present application clearer, the technical solutions in embodiments of the present application will be clearly and completely described below with reference to the accompanying drawings for a plurality of embodiments according to the present application. It should be understood that, the described embodiments are merely some of, rather than all of, the embodiments of the present application. All the other embodiments obtained by those of ordinary skill in the art based on the embodiments disclosed in the present application without creative efforts shall fall within the scope of protection of the present application.

Unless otherwise defined, all technical and scientific terms used in the present application have the same meanings as those commonly understood by those skilled in the technical art to which the present application pertains. The terms used in the specification of the present application are merely for the purpose of describing specific embodiments, but are not intended to limit the present application. The terms "comprising", "including", "having", "possessing", "containing", "involving" and the like in the specification, claims and the foregoing description of the accompanying drawings of the present application are open words. Therefore, a method or apparatus "comprising", "including" or "having" for example one or more steps or elements, has one or more steps or elements, but is not limited to merely having the one or more elements. The terms "first", "second", and the like in the specification, the claims, or the foregoing accompanying drawings of the present application, are intended to distinguish between different objects, rather than to describe a specific order or primary-secondary relationship. In addition, the terms "first" and "second" are only intended for the purpose of description, and shall not be understood as an indication or implication of relative importance or implicit indication of the quantity of indicated technical features. Therefore, a feature limited by "first" or "second" may explicitly or implicitly include one or more features. In the description of the present application, unless otherwise provided, "a plurality of" means two or more than two.

In the description of the present application, it should be understood that orientations or positional relationships indicated by terms such as "center", "crosswise", "length", "width", "up", "down", "front", "rear", "left", "right", "vertical", "horizontal", "top", "bottom", "inside", "outside", "axial direction", "radial direction" and "circumferential direction" are orientations or positional relationships shown based on the drawings, and the terms are merely for convenience of describing the present application and for simplifying the description, rather than for indicating or implying that an indicated apparatus or element must have a specific orientation, and must be constructed and operated in a specific orientation, which thus may not be understood as a limitation the present application.

In the description of the present application, it should be noted that, unless explicitly specified and defined otherwise, terms "installation", "interconnection", "connection" and "attachment" should be understood broadly, for example, they may either be a fixed connection, or a detachable connection, or an integrated connection; and they may either be a direct connection, or an indirect connection through an intermediary, or may be communication between interiors of two elements. Those of ordinary skill in the art may understand the specific meanings of the foregoing terms in the present application according to specific conditions.

The phrase "embodiment" referred to in the present application means that the specific features, structures, and characteristics described with reference to the embodiments may be included in at least one embodiment of the present application. The phrase at various locations in the specification does not necessarily refer to the same embodiment, or an independent or alternate embodiment that is mutually exclusive from another embodiment. Those skilled in the art understand, in explicit and implicit manners, that the embodiments described in the present application may be in combination with another embodiment.

As described above, it should be emphasized that the term "comprising/including", when used in this specification, is used to clearly specify the presence of stated features, integers, steps or assemblies, but do not preclude the presence or addition of one or more other features, integers, steps, or components or groups of features, integers, steps or components. As used in the present application, the singular form "a", "an" and "the" include plural forms unless the context clearly dictates otherwise.

The terms "a" and "an" in this specification can mean one, but may have the same meaning as "at least one" or "one or more". The term "about" generally means plus or minus 10%, or more specifically plus or minus 5%, of the mentioned value. The term "or" used in the claims means "and/or" unless it is clearly stated that it only refers to an alternative solution.

The term "and/or" in the present application merely describes an association relationship between associated objects and indicates that there may be three relationships. For example, A and/or B may indicate the following three cases: A exists alone, both A and B exist, and B exists alone. In addition, the character "/" in the present application generally indicates that the associated previous and next objects are in the relationship of "or".

A battery mentioned in the art can be divided into a primary battery and a rechargeable battery according to whether it is rechargeable. The primary battery is also called a "disposable" battery or a galvanic battery, because after its power is exhausted, it cannot be recharged and can only be discarded. The rechargeable battery is also called a secondary battery, a second-level battery, or a storage battery. Manufacturing materials and processes of the rechargeable battery are different from those of the primary battery. Its advantage is that it can be cycled multiple times after being charged, and output current load capacity of the rechargeable battery is higher than that of most primary batteries. At present, common types of rechargeable batteries are: a lead-acid battery, a nickel-metal hydride battery (Ni-MH battery) and a lithium-ion battery. The lithium-ion battery has the advantages such as light weight, large capacity (1.5 to 2 times that of Ni-MH battery of the same weight), and no memory effect, and has a very low self-discharge rate, so even if its price is relatively high, it still gets widely used. At present, the lithium-ion battery is also widely applied in battery electric vehicles and hybrid vehicles. The capacity of lithium-ion battery for this purpose is relatively low, but it has a larger output and charging current, and a longer service life, but a higher cost.

A battery described in embodiments of the present application refers to a rechargeable battery. Hereinafter, the embodiments disclosed in the present application will be described mainly by an example of a lithium-ion battery. It should be understood that the embodiments disclosed in the present application are applicable to any other suitable type of rechargeable battery. The battery mentioned in the embodiments disclosed in the present application can be directly or indirectly applied to an appropriate apparatus to power the apparatus.

The battery mentioned in the embodiments disclosed in the present application refers to a single physical module including one or more battery cells to provide a predetermined voltage and capacity. For example, the battery mentioned in the present application may include a battery module, a battery pack, and the like. A battery cell is a basic unit in a battery, and generally, can be divided into a cylindrical battery cell, a prismatic battery cell and a pouch battery cell according to the way of packaging. The following will mainly focus on a prismatic battery cell. It should be understood that the embodiments described below are also applicable to a cylindrical battery cell or a pouch battery cell in certain aspects.

The battery cell includes a positive electrode sheet, a negative electrode sheet, an electrolytic solution and an isolation film. The operation of a lithium-ion battery cell mainly relies on movement of lithium ions between the positive electrode sheet and the negative electrode sheet. For example, the lithium-ion battery cell uses one embedded lithium compound as one electrode material. Currently, main common materials used as a cathode material of a lithium-ion battery are: lithium cobalt oxide ($LiCoO_2$), lithium manganese oxide ($LiMn_2O_4$), lithium nickel oxide ($LiNiO_2$) and lithium iron phosphate ($LiFePO_4$). The isolation film is disposed between the positive electrode sheet and the negative electrode sheet to form a thin film structure with three layers of materials. The thin film structure is generally made into an electrode assembly with a desired shape by winding or stacking. For example, a thin film structure with three layers of materials in a cylindrical battery cell is wound into a cylindrical electrode assembly, while in a prismatic battery cell the thin film structure is wound or stacked into an electrode assembly in a substantially cuboid shape.

A plurality of battery cells may be connected in series and/or in parallel via electrode terminals for various applications. In some high-power applications such as electric automobiles, application of a battery includes three levels: a battery cell, a battery module, and a battery pack. The battery module is formed by electrically connecting a certain number of battery cells together and putting them in a frame in order to protect the battery cells from external impact, heat, vibration, or the like. The battery pack is a final state of a battery system installed in an electric automobile. The battery pack generally includes a case for packaging one or more battery cells. The case can prevent liquid or other foreign matters from affecting the charging or discharging of the battery cell. The case is generally composed of a cover body and a case shell. Most of current battery packs are made by assembling various control and protection systems such as a battery management system (BMS) and a thermal management component on one or more battery modules. With the development of technology, the level of battery module may be omitted, that is, a battery pack is directly formed from battery cells. This improvement allows the battery system to significantly reduce the number of components while increasing weight energy density and volume energy density. The battery mentioned in the present application includes a battery module or a battery pack.

A battery cell is usually provided with a pressure relief mechanism. The pressure relief mechanism refers to an element or component that can be actuated when an internal pressure or temperature of the battery cell reaches a predetermined threshold, to relieve the internal pressure. The pressure relief mechanism is also called an anti-explosion valve, a gas valve, a pressure relief valve, a safety valve, or the like. The pressure relief mechanism may specifically adopt a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, so as to form an opening or channel for relieving the internal pressure.

The "actuation" mentioned in the present application means that the pressure relief mechanism acts or is activated to relieve the internal pressure of the battery cell. The action generated may include but be not limited to: at least a portion of the pressure relief mechanism being fractured, torn, broken or opened, and so on. When the pressure relief mechanism is actuated, high-temperature and high-pressure substances inside the battery cell are discharged outwards from an actuated position as emissions. In this way, the pressure of the battery cell can be relieved under controllable pressure, thereby avoiding more serious accidents. The emissions from the battery cell mentioned in the present application include but are not limited to: an electrolytic solution, dissolved or split positive and negative electrode sheets, fragments of an isolation film, high-temperature and high-pressure gas generated by reaction, flame, or the like. The high-temperature and high-pressure emissions are discharged toward a direction in which the pressure relief mechanism of the battery cell is provided. The strength and destructive power are huge, or may even be large enough to break through one or more structures such as the cover body provided in this direction.

For a conventional pressure relief mechanism, it requires a certain avoidance space when actuated. The avoidance space refers to internal and external spaces of the pressure relief mechanism in an actuation direction (that is, a torn direction) when the pressure relief mechanism is actuated (for example, at least a portion of the pressure relief mechanism is torn). In other words, the avoidance space is a space allowing the pressure relief mechanism to be actuated. Since a cover plate of the battery cell is thicker than a housing, it is easier to form the avoidance space when the pressure relief mechanism is provided on the cover plate, thereby being conducive to the design and manufacture of the battery cell. Specifically, since the housing of the battery cell is formed by stamping an aluminum sheet, compared with the cover plate, a wall thickness of the stamped housing is very thin. On the one hand, the relatively thin wall thickness of the housing makes it difficult to provide a pressure relief mechanism requiring an avoidance space thereon. On the other hand, an integral concave structure of the housing makes it difficult to install a pressure relief mechanism thereon, which would also cause the increase of costs of the battery cell.

In addition, after an existing battery cell is actuated, its discharged wastes are generally directly discharged to the outside of a battery, which not only pollutes the environment, but also is likely to cause danger to the external environment due to emissions with huge heat.

In general, for researchers and those skilled in the art, to change the design concept of an avoidance structure of a conventional battery, it is necessary to solve various technical problems and overcome technical prejudices, and it is not achieved overnight.

In order to solve or at least partially solve the above-mentioned problems and other potential problems of a battery in the prior art, the inventor of the present application goes the other way and proposes a novel battery after conducting a lot of research and experiments. Applicable apparatuses for the battery described in the embodiments of the present application include, but are not limited to: mobile phones, portable devices, notebook computers, electromobiles, electric vehicles, ships, spacecrafts, electric toys, electric tools, and the like. For example, the spacecrafts include airplanes, rockets, space shuttles and spaceships, and the like; the electric toys include fixed or mobile electric toys, such as game consoles, electric vehicle toys, electric ship toys and electric airplane toys, and the like; the electric tools include electric metal cutting tools, electric grinding tools, electric assembling tools and electric railway tools, such as electric drills, electric grinders, electric spanners, electric screwdrivers, electric hammers, electric impact drills, concrete vibrators and electric planers.

The battery described in the embodiments of the present application is not only applicable to the devices described above, but also applicable to all devices using batteries. However, for brief description, the following embodiments are all described by an example of an electric automobile.

For example, as shown in FIG. 1, the figure is a simplified schematic diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. The vehicle 1 may be internally provided with a battery 10. For example, the battery 10 may be provided at the bottom, head or tail of the vehicle 1. The battery 10 may be used for power supply to the vehicle 1. For example, the battery 10 may serve as an operation power source of the vehicle 1. Moreover, the vehicle 1 may further include a controller 30 and a motor 40. The controller 30 is configured to control the battery 10 to supply power to the motor 40, for example, for a working power requirement demand of the vehicle 1 during startup, navigation and running. In another embodiment of the present application, the battery 10 may serve not only as an operation power source of the vehicle 1, but also as a driving power source of the vehicle 1, replacing or partially replacing fuel or natural gas to provide driving power for the vehicle 1. The battery 10 referred to below may also be understood as a battery pack including a plurality of battery cells 20.

Figure 2:
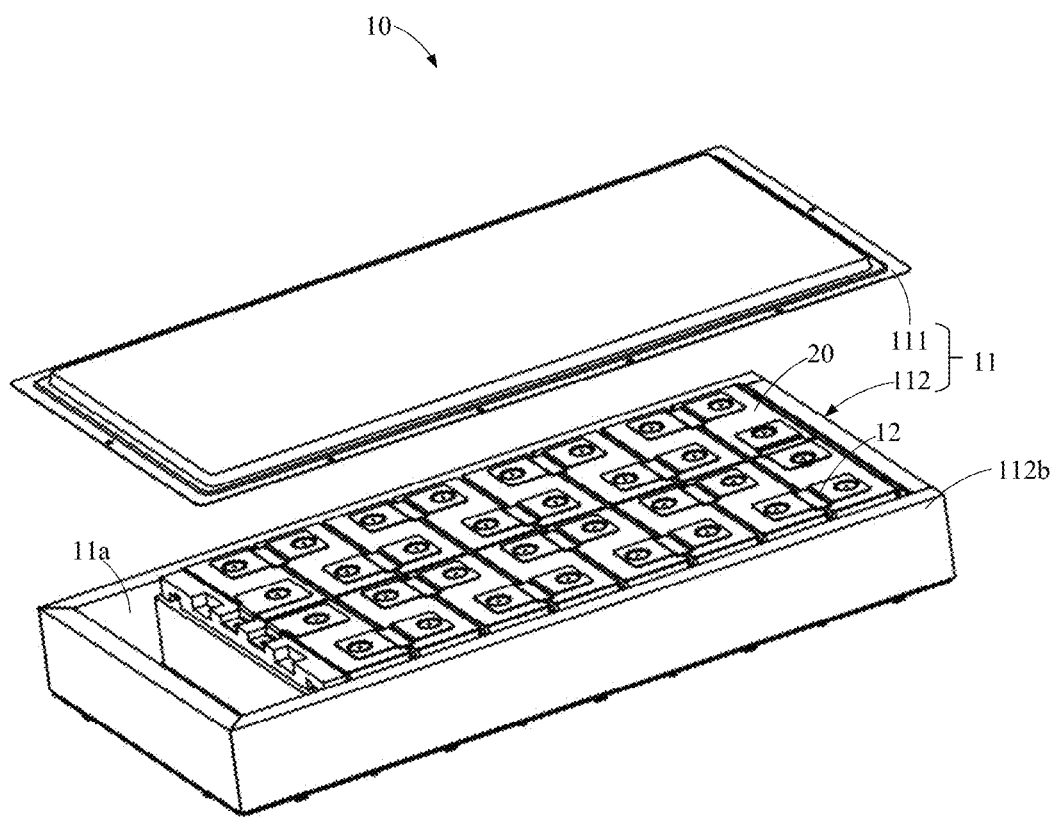
FIG. 2 shows an exploded schematic diagram of a battery according to some embodiments of the present application.
Figure 3:
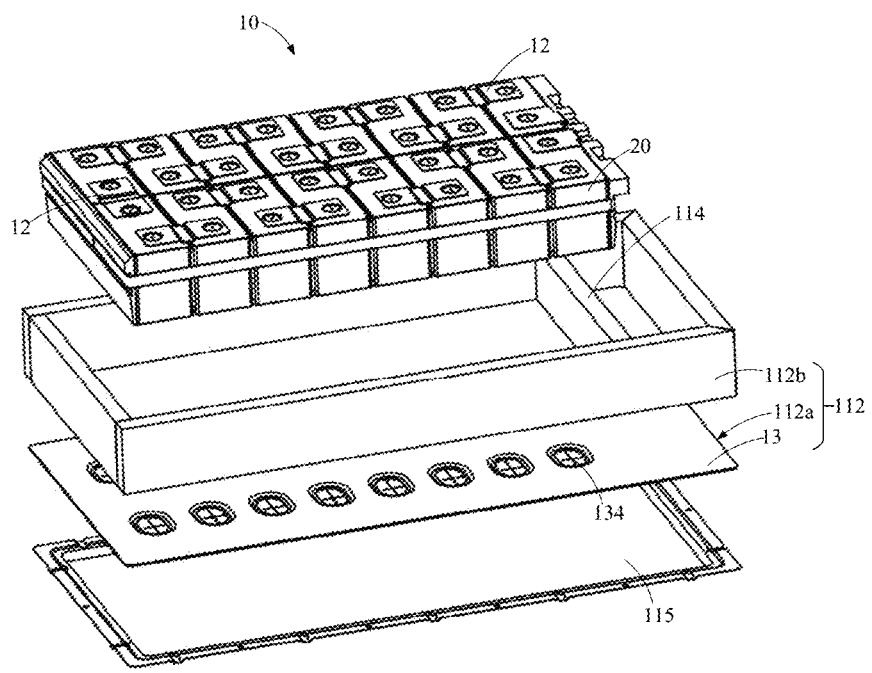
FIG. 3 shows an exploded schematic diagram of a battery according to some embodiments of the present application.

FIGS. 2 and 3 respectively show exploded views of a battery 10 according to an embodiment of the present application. As shown in FIGS. 2 and 3, the battery 10 includes a plurality of battery cells 20 and a bus component 12 for electrically connecting the plurality of battery cells 20. In order to protect the battery cells 20 from invasion or erosion of external liquids or foreign matters, the battery 10 includes a case 11 for enclosing the plurality of battery cells and other necessary components, as shown in FIGS. 2 and 3. In some embodiments, the case 11 may include a cover body 111 and a case shell 112, the battery 10 may further include a beam 114 extending between the cover body 111 and the case shell 112, and the beam 114 may extend from a bottom portion 112a of the case shell 112 to the cover body 111 in a direction perpendicular to the bottom portion 112a. The cover body 111 and the case shell 112 are combined together in a sealing manner to collectively enclose and form an electrical chamber 11a for accommodating the plurality of battery cells 20. In some other embodiments, the cover body 111 and the case shell 112 may be combined with each other in an unsealing manner.

Figure 4:
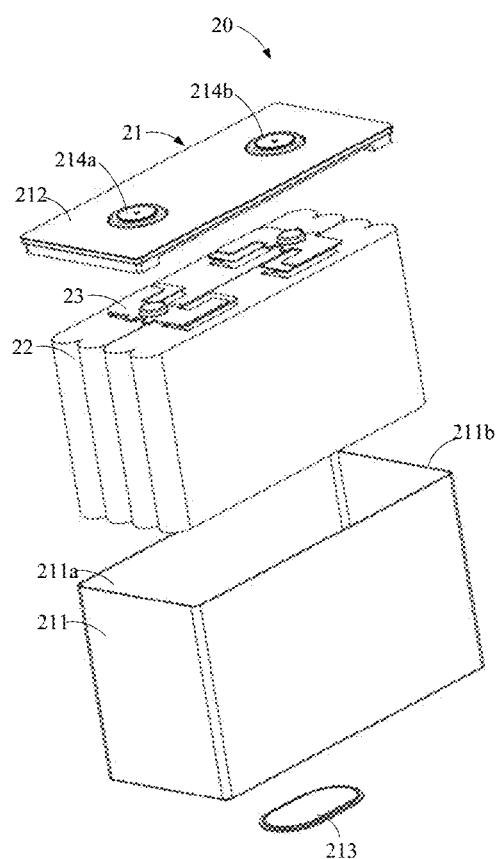
FIG. 4 shows an exploded schematic diagram of a battery cell according to some embodiments of the present application.
Figure 5:
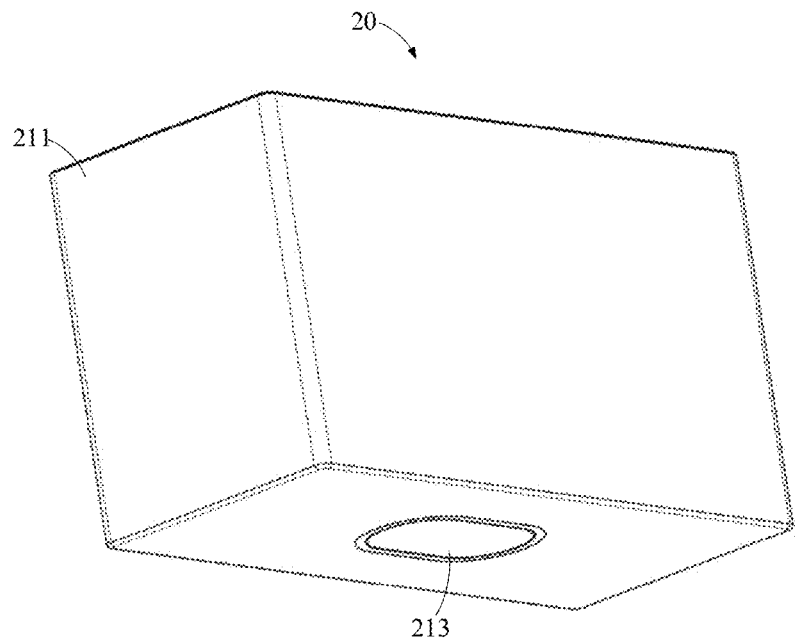
FIG. 5 shows a schematic perspective view of a battery cell according to some embodiments of the present application.
Figure 6:
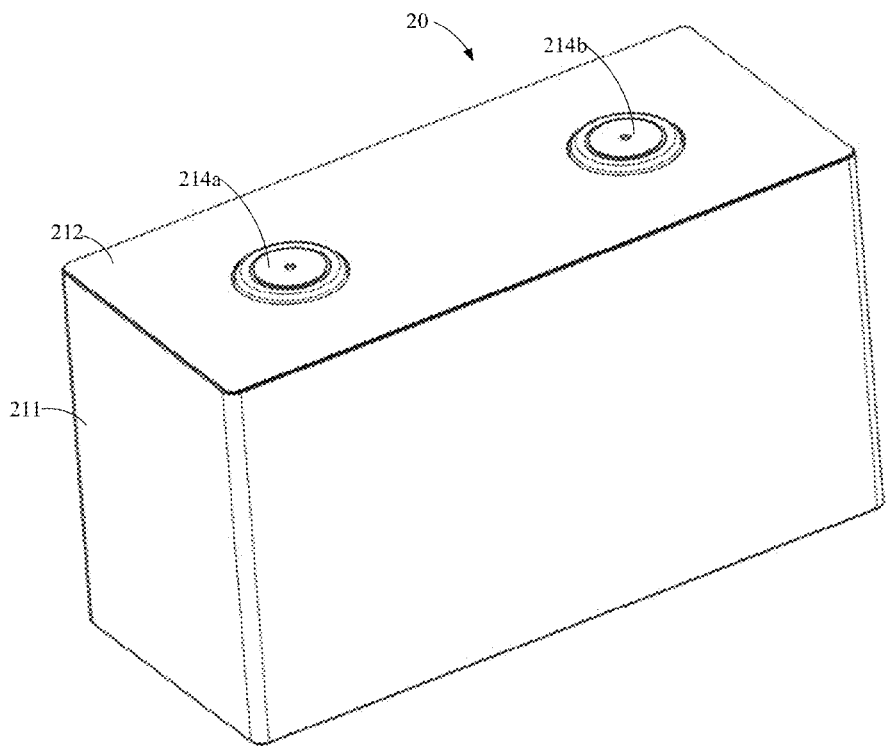
FIG. 6 shows a schematic perspective view of a battery cell according to some embodiments of the present application.

FIG. 4 shows an exploded view of a battery cell 20 according to an embodiment of the present application, and FIGS. 5 and 6 respectively show three-dimensional views of the battery cell 20 from different angles. As shown in FIG. 4 to FIG. 6, the battery cell 20 according to the present application includes a box 21, an electrode assembly 22 and an electrolytic solution. The electrode assembly 22 is accommodated in the box 21 of the battery cell 20, and the electrode assembly 22 includes a positive electrode sheet, a negative electrode sheet and an isolation film. A material of the isolation film may be PP, PE, or the like. The electrode assembly 22 may be a coiled structure or a laminated structure. The box 21 includes a housing 211 and a cover plate 212. The housing 211 includes an accommodation chamber 211a formed from a plurality of walls and an opening 211b. The cover plate 212 is arranged at the opening 211b to close the accommodation chamber 211a. In addition to the electrode assembly 22, the accommodation chamber 211a also accommodates the electrolytic solution. The positive electrode sheet and the negative electrode sheet in the electrode assembly 22 are generally provided with electrode tabs. The electrode tabs generally include a positive electrode tab and a negative electrode tab. Specifically, the positive electrode sheet includes a positive electrode current collector and a positive electrode active material layer. The positive electrode active material layer is coated on a surface of the positive electrode current collector, the positive electrode current collector not coated with the positive electrode active material layer protrudes from the positive electrode current collector coated with the positive electrode active material layer and serves as a positive electrode tab. The material of the positive electrode current collector may be aluminum, and the positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, and the negative electrode current collector not coated with the negative electrode active material layer protrudes from the negative electrode current collector coated with the negative electrode active material layer and serves as a negative electrode tab. A material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. The electrode tabs are electrically connected to an electrode terminal 214 located outside the battery cell 20 through a connecting member 23. The electrode terminal 214 generally includes a positive electrode terminal 214a and a negative electrode terminal 214b. At least one of the battery cells 20 in the battery 10 of the present application includes a pressure relief mechanism 213. In some embodiments, a battery cell of the plurality of battery cells 20 that is more likely to suffer thermal runaway due to a position of the battery call in the battery cell 10 may be provided with a pressure relief mechanism 213. Certainly, it is also possible that each battery cell 20 in the battery 10 is provided with a pressure relief mechanism 213.

The pressure relief mechanism 213 refers to an element or component that is actuated when an internal pressure or temperature of the battery cell reaches a predetermined threshold, to relieve the internal pressure. The threshold referred to in the present application may be a pressure threshold or a temperature threshold. The threshold design is different according to different design requirements. For example, the threshold may be designed or determined according to an internal pressure or internal temperature value of a battery cell that is considered to have danger and a risk of being out of control. Moreover, the threshold may depend on the material of one or more of the positive electrode sheet, the negative electrode sheet, the electrolytic solution and the isolation film in the battery cell. In other words, the pressure relief mechanism 213 is configured to be actuated when an internal pressure or temperature of the at least one battery cell 20 in which it is located reaches a threshold, to relieve internal pressure of the battery, thereby avoiding more dangerous accidents. As mentioned above, the pressure relief mechanism 213 may be also called an anti-explosion valve, a gas valve, a pressure relief valve, a safety valve, or the like. The bus component 12 is also called a bus bar, a bus, or the like, which is a component that electrically connects the plurality of battery cells 20 in series and/or in parallel. The plurality of battery cells 20 have a higher voltage after being connected in series and/or in parallel by the bus component 12. Therefore, a side having the bus component 12 is sometimes referred to as a high-voltage side. In some implementation manners, the pressure relief mechanism 213 in the battery 10 is provided on a bottom side of the battery cell 20.

Figure 7:
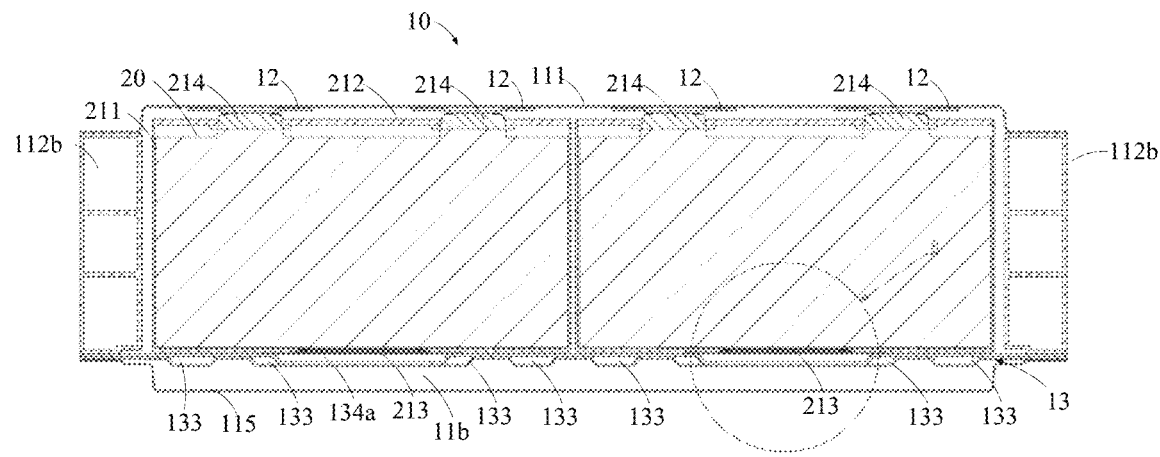
FIG. 7 shows a sectional view of a battery according to some embodiments of the present application.
Figure 8:
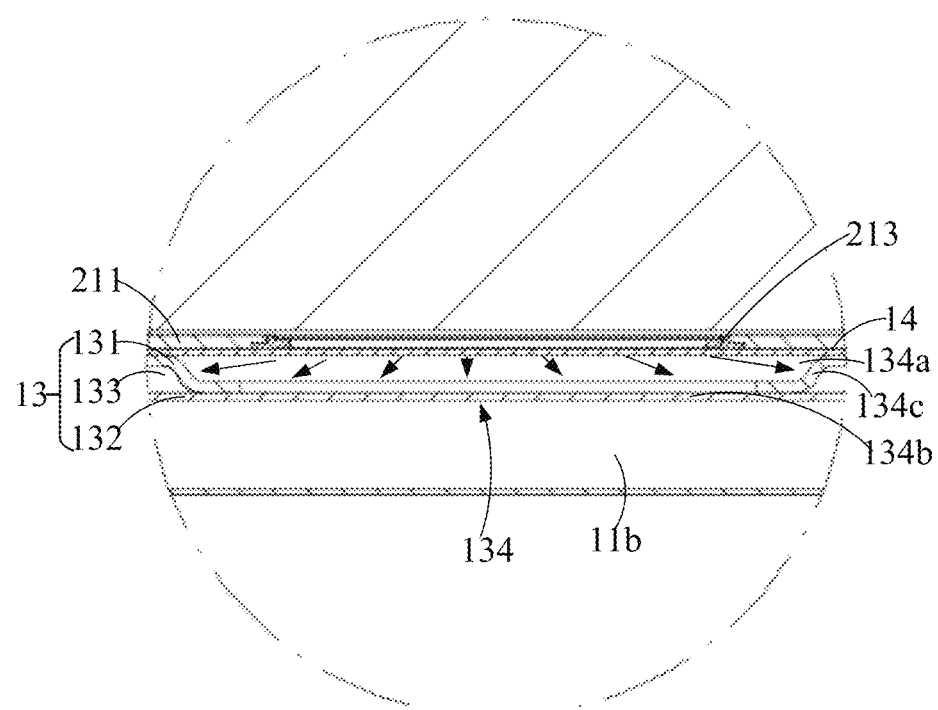
FIG. 8 shows an enlarged view of a portion B of the battery shown in FIG. 7.

FIG. 8 shows an enlarged view of a portion B in FIG. 7. As shown in FIG. 8, in some embodiments, the battery 10 may further include a thermal management component 13. The thermal management component 13 in the present application refers to a component that can manage and adjust a temperature of the battery cell 20. The thermal management component 13 can accommodate a fluid to manage and adjust the temperature of the battery cell 20. The fluid here may be liquid or gas. The management and adjustment of the temperature may include heating or cooling the plurality of battery cells 20. For example, in a case of cooling or lowering the temperature of the battery cell 20, the thermal management component 13 is configured to accommodate a cooling fluid to lower the temperature of the plurality of battery cells 20. In this case, the thermal management component 13 may also be called a cooling component, a cooling system, a cooling plate, or the like. The fluid accommodated in it may also be called a cooling medium or a cooling fluid, and more specifically, may be called a cooling liquid or a cooling gas, where the cooling medium may be designed to flow in a circulating manner to achieve a better temperature adjustment effect. The cooling medium may specifically use water, a mixture of water and ethylene glycol, air, or the like. In order to achieve effectiveness of adjusting the temperature, the thermal management component 13 is generally attached to the battery cell 20 by means such as thermally conductive silica gel. In addition, the thermal management component 13 may also be used for heating to raise the temperature of the plurality of battery cells 20. For example, heating the battery 10 could improve battery performance before starting an electric vehicle in some regions with colder temperatures in winter.

With continuing reference to FIG. 8, an avoidance chamber 134a is formed between the pressure relief mechanism 213 and the thermal management component 13, and the avoidance chamber 134a can leave a space allowing the pressure relief mechanism to be actuated. A collection chamber 11b is formed on an outer side of the avoidance chamber 134a, and the collection chamber 11b is configured to collect emissions from the battery cell 20 when the pressure relief mechanism 213 is actuated. Due to provision of the avoidance chamber 134a, the pressure relief mechanism 213 may do not need to be provided on a side of the electrode terminal 214 of the battery cell 20, and may be selectively provided on another side of the battery cell 20; and provision of the collection chamber 11b could allow emissions discharged from the pressure relief mechanism 213 to be collected without being sprayed or flowing to the outside, thereby not causing pollution to other components or the external environment. The solution provided in the present application could achieve that the emissions of the battery cell 20 can be effectively discharged in a case that thermal runaway occurs inside the battery 10, thereby reducing a risk caused by poor discharge of the emissions.

Structures of the avoidance chamber 134a and the collection chamber 11b will be described in detail below with reference to the specific structure of the thermal management component 13.

In some embodiments, the thermal management component 13 may include a pair of thermally conductive plates and a flow channel 133 formed between the pair of thermally conductive plates. For convenience of the description below, the pair of thermally conductive plates will be referred to as a first thermally conductive plate 131 attached to the plurality of battery cells 20 and a second thermally conductive plate 132 arranged on a side of the first thermally conductive plate 131 away from the battery cells 20. The flow channel 133 is configured to accommodate a fluid and allow the fluid to flow therein. In some embodiments, the avoidance chamber 134a is configured to be surrounded by the flow channel 133. In some embodiments, the thermal management component 13 including the first thermally conductive plate 131, the second thermally conductive plate 132 and the flow channel 133 may be integrally formed by an appropriate process such as blow molding, or the first thermally conductive plate 131 and the second thermally conductive plate 132 are assembled together by welding (such as brazing). In some alternative embodiments, the first thermally conductive plate 131, the second thermally conductive plate 132 and the flow channel 133 may be formed separately and assembled together to form the thermal management component 13.

In some embodiments, the thermal management component 13 may constitute a portion of the case 11 for accommodating the plurality of battery cells. For example, the thermal management component 13 may be the bottom portion 112a of the case shell 112 of the case 11. In addition to the bottom portion 112a, the case shell 112 further includes side portions 112b. As shown in FIG. 7, in some embodiments, the side portions 112b are formed into a frame structure, and can be assembled with the thermal management component 13 to form the case shell 112. In this way, the structure of the battery 10 could be more compact, and effective utilization of space could be improved, which is conducive to improvement of energy density.

The thermal management component 13 and the side portions 112b may be assembled together by a sealing member such as a sealing ring and a fastener in a sealing manner. In order to improve the sealing effect, the fastener may use a flow drill screw (FDS). Certainly, it should be understood that this sealing assembly manner is only illustrative, and is not intended to limit the protection scope of the content of the present application. Any other suitable assembly manner is also possible. For example, in some alternative embodiments, the thermal management component 13 and the side portions 112b may be assembled together in an appropriate manner such as bonding.

In some alternative embodiments, the thermal management component 13 and the side portions 112b may also be integrally formed. In other words, the case shell 112 of the case 11 may be integrally formed. This formation manner could increase the strength of the case shell 112 and is less prone to leakage. In some alternative embodiments, the side portions 112b of the case shell 112 may be integrally formed with the cover body 111. In other words, in this case, the cover body 111 constitutes a structure with a lower opening, and the lower opening may be closed by the thermal management component 13.

In other words, a relationship between the thermal management component 13 and the case 11 may be various. For example, in some alternative embodiments, the thermal management component 13 may not be a portion of the case shell 112 of the case 11, but a component assembled on a side of the case shell 112 facing the cover body 111. This manner is more conducive to keeping the case 11 closed. In some alternative embodiments, the thermal management component 13 may be integrated on an inner side of the case shell 112 in an appropriate manner.

As mentioned above, some pressure relief mechanism 213 needs to be provided with an avoidance structure 134 at a position outside the battery cell 20 corresponding to the pressure relief mechanism 213 when actuated, so that the pressure relief mechanism 213 could be smoothly actuated to perform its intended function. In some embodiments, the avoidance structure 134 may be arranged on the thermal management component 13, so that in a case that the thermal management component 13 is attached to the plurality of battery cells 20, an avoidance chamber 134a can be formed between the avoidance structure 134 and the pressure relief mechanism 213. In other words, the avoidance chamber 134a mentioned in the present application refers to a closed hollow chamber formed by collective surrounding of the avoidance structure 134 and the pressure relief mechanism 213. In this solution, for the discharge of the emissions from the battery cell 20, an inlet side surface of the avoidance chamber 134a may be opened by actuation of the pressure relief mechanism 213, and an outlet side surface opposite to the inlet side surface may be partially damaged and opened due to high-temperature and high-pressure emissions, thereby forming a relief channel for the emissions. According to some other embodiments, the avoidance chamber 134a may be, for example, a non-closed hollow chamber formed by collective surrounding of the avoidance structure 134 and the pressure relief mechanism 213. An outlet side surface of the non-closed hollow chamber may originally have a channel for the emissions to flow out.

As shown in FIG. 8, in some embodiments, the avoidance structure 134 formed on the thermal management component 13 may include an avoidance bottom wall 134b and an avoidance side wall 134c surrounding the avoidance chamber 134a. The avoidance bottom wall 134b and the avoidance side wall 134c in the present application are relative to the avoidance chamber 134a. Specifically, the avoidance bottom wall 134b refers to a wall of the avoidance chamber 134a opposite to the pressure relief mechanism 213, and the avoidance side wall 134c is a wall adjacent to and at a predetermined angle with respect to the avoidance bottom wall 134b to surround the avoidance chamber 134a. In some embodiments, the avoidance bottom wall 134b may be a portion of the second thermally conductive plate 132, and the avoidance side wall 134c may be a portion of the first thermally conductive plate 131.

For example, in some embodiments, the avoidance structure 134 may be formed by recessing a portion of the first thermally conductive plate 131 toward the second thermally conductive plate 132 to form an opening, and fixing an edge of the opening and the second thermally conductive plate 132 together in a suitable fixing manner. When the pressure relief mechanism 213 is actuated, the emissions from the battery cell 20 will first enter the avoidance chamber 134a. As shown by arrows in the avoidance chamber 134a of FIG. 8, the emissions are discharged outwards in a fan-shaped direction.

Unlike a conventional thermal management component, the thermal management component 13 according to the embodiment of the present application can be damaged when the pressure relief mechanism 213 is actuated, so that the emissions from the battery cell 20 pass through the thermal management component 13. An advantage of this arrangement is that high-temperature and high-pressure emissions from the battery cell 20 are allowed to pass through the thermal management component 13 smoothly, so as to avoid secondary accidents caused by the emissions not being discharged in time, thereby improving safety performance of the battery 10.

Figure 9:
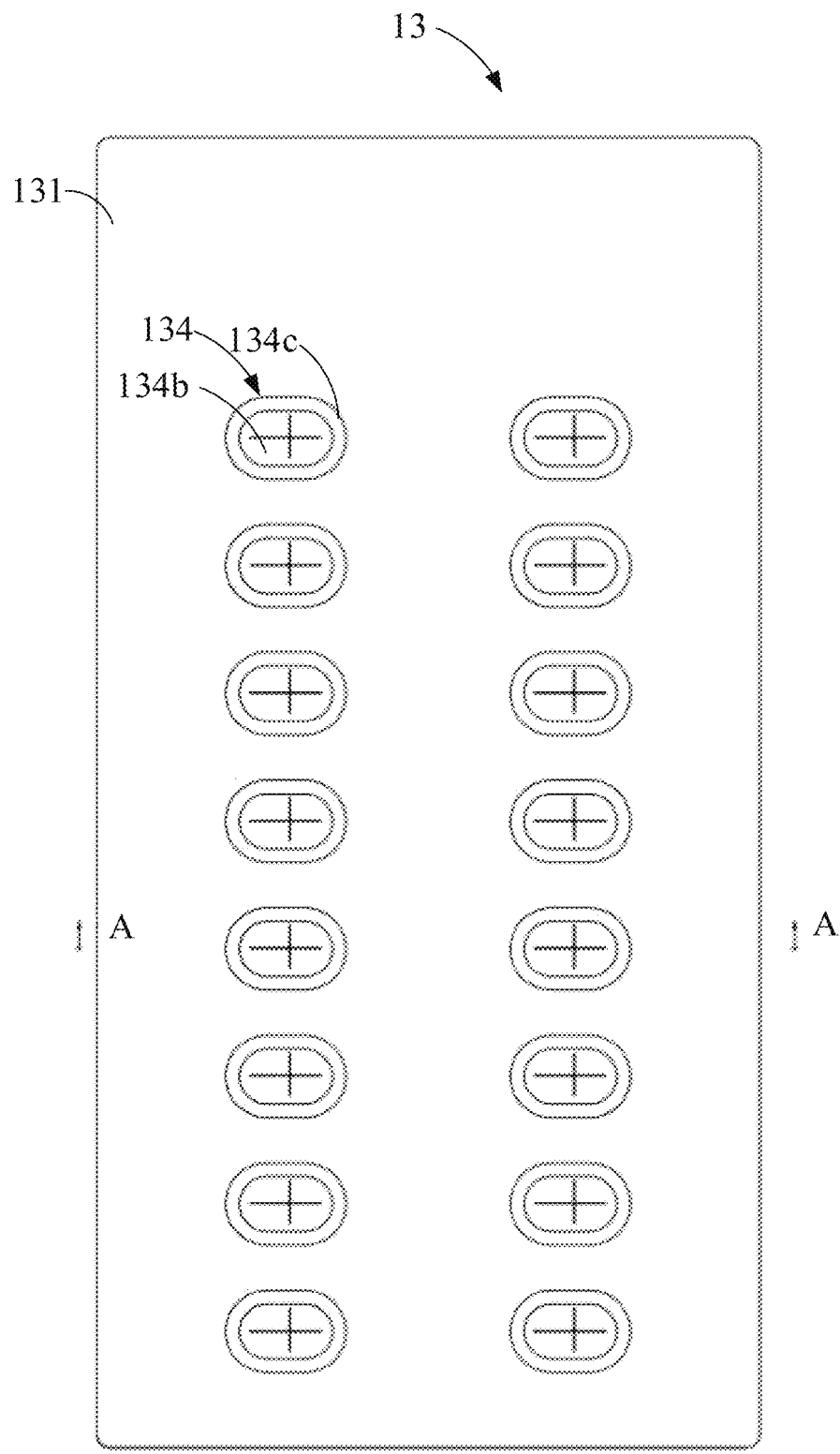
FIG. 9 shows a top view of a thermal management component according to some embodiments of the present application.

In order to allow the emissions to pass through the thermal management component 13 smoothly, a through hole or a relief mechanism may be provided at a position of the thermal management component 13 opposite to the pressure relief mechanism 213. For example, in some embodiments, a relief mechanism may be provided on the avoidance bottom wall 134b, that is, on the second thermally conductive plate 132. The relief mechanism in the present application refers to a mechanism that can be actuated when the pressure relief mechanism 213 is actuated, to allow at least the emissions from the battery cell 20 to pass through the thermal management component 13 to be discharged. In some embodiments, the relief mechanism may also adopt the same structure as the pressure relief mechanism 213 on the battery cell 20. In other words, in some embodiments, the relief mechanism may be a mechanism that is arranged on the second thermally conductive plate 132 and has the same structure as the pressure relief mechanism 213. In some alternative embodiments, the relief mechanism may also adopt a structure different from the pressure relief mechanism 213, and is only a weakened structure provided at the avoidance bottom wall 134b. The weakened structure may include, but is not limited to: a thinned part integral with the avoidance bottom wall 134b, an indentation (for example, a cross-shaped indentation 134d as shown in FIG. 9), or a vulnerable part made of a vulnerable material such as plastic installed at the avoidance bottom wall 134b, for example. Alternatively, the relief mechanism may be a temperature-sensitive or pressure-sensitive relief mechanism, which is actuated when a temperature or pressure sensed by the relief mechanism exceeds a threshold.

In some embodiments, in order to allow the emissions to pass through the thermal management component 13 smoothly, the avoidance structure 134 may also be a through hole penetrating the thermal management component 13. In other words, the avoidance structure 134 may only have the avoidance side wall 134c, and the avoidance side wall 134c is thus a hole wall of the through hole. In this case, when the pressure relief mechanism 213 is actuated, the emissions from the battery cell 20 can directly pass through the avoidance structure 134 and be discharged. In this way, formation of secondary high pressure could be avoided more effectively, thereby improving safety performance of the battery 10.

In some embodiments, the thermal management component 13 may also be configured to be damaged when the pressure relief mechanism 213 is actuated, to allow the fluid to flow out. The fluid outflow could quickly lower the temperature of the high-temperature and high-pressure emissions from the battery cell 20 and extinguish them, thereby avoiding further damage to other battery cells 20 and the battery 10 so as not to cause more serious accidents. For example, in some embodiments, the avoidance side wall 134c may also be formed to be easily damaged by the emissions from the battery cell 20, so that the flow channel 133 is in communication with the avoidance chamber 134a, and thus the fluid in the flow channel 133 may flow into the avoidance chamber 134a and/or the collection chamber 11b.

Since internal pressure of the battery cell 20 is relatively great, the emissions from the battery cell 20 will be discharged outwards in a substantially conical shape. In this case, if a contact area between the avoidance side wall 134c and the emissions can be increased, the possibility that the avoidance side wall 134c is damaged could be increased. For example, in some embodiments, the avoidance side wall 134c is configured to be at a predetermined included angle relative to a direction of the pressure relief mechanism 213 toward the thermal management component 13, and the included angle is greater than or equal to 15° and less than or equal to 85°. For example, the predetermined included angle shown in FIG. 8 is about 45°. By properly setting the included angle, the avoidance side wall 134c could be more easily damaged when the pressure relief mechanism 213 is actuated, so as to further allow the fluid to flow out to contact the emissions, and achieve the effect of cooling the emissions in time. In addition, the predetermined included angle can also enable the avoidance side wall 134c to be formed more easily. For example, the predetermined included angle can provide a certain draft angle, thereby being conducive to the manufacture of the avoidance side wall 134c and even the entire first thermally conductive plate 131.

In other unshown embodiments, the flow channel 133 may also be configured to remain intact in a process of the emissions of the battery cell 20 flowing through the thermal management component 13. It should be noted that the "remain intact" mentioned here means that the flow channel 133 is not damaged in the process of the emissions of the battery cell 20 flowing through the thermal management component 13, so that the flow channel 133 is not in communication with the outside, and the fluid in the flow channel 133 is not released into a space outside the flow channel 133.

In addition, this arrangement manner of the avoidance side wall 134c may be applied to the above-mentioned situation with the avoidance chamber 134a and the situation where the avoidance structure 134 is a through hole. For example, in a case that the avoidance structure 134 is a through hole, an aperture of the through hole may gradually decrease in a direction of the pressure relief mechanism 213 toward the thermal management component 13, and an included angle formed from a hole wall of the through hole with respect to the direction of the pressure relief mechanism 213 toward the thermal management component 13 is greater than or equal to 15° and less than or equal to 85°.

Certainly, it should be understood that the forgoing configuration that of the avoidance side wall 134c is at the predetermined included angle with respect to the direction of the pressure relief mechanism 213 toward the thermal management component 13 is only illustrative, and is not intended to limit the protection scope of the content of the present application. Any other suitable structure that can help the avoidance side wall 134c be damaged when the pressure relief mechanism 213 is actuated is feasible. For example, in some embodiments, any type of weakened structure may also be provided on the avoidance side wall 134c.

The above embodiments describe the case that the thermal management component 13 has the avoidance structure 134. In other words, the avoidance chamber 134a mentioned in the above embodiments is formed form the avoidance structure 134 on the thermal management component 13 and the pressure relief mechanism 213. It should be understood that the foregoing embodiments about the avoidance chamber 134a are only illustrative, and are not intended to limit the protection scope of the content of the present application, and any other appropriate structure or arrangement is also possible. For example, in some alternative embodiments, the thermal management component 13 may not include the avoidance structure 134. In this case, the avoidance chamber 134a may be formed from a protruding portion formed around the pressure relief mechanism 213 and the thermal management member 13, for example. Moreover, a position of the thermal management component 13 opposite to the pressure relief mechanism 213 may be provided with a relief mechanism or a weakened structure, so that the emissions from the battery cell 20 can pass through the thermal management component 13 and/or break through the thermal management component 13 to allow the fluid to flow out.

Certainly, in some embodiments, the avoidance chamber 134a may not be used. For example, for some pressure relief mechanisms 213 that can be actuated without an avoidance space, the pressure relief mechanism 213 may be arranged in close contact with the thermal management component 13. Such pressure relief mechanism 213 may include, but is not limited to, a temperature-sensitive pressure relief mechanism 213, for example. The temperature-sensitive pressure relief mechanism 213 is a mechanism that is actuated when a temperature of the battery cell 20 reaches a threshold, to relieve internal pressure of the battery cell 20. Corresponding to this is a pressure-sensitive pressure relief mechanism 213. The pressure-sensitive pressure relief mechanism 213 is the pressure relief mechanism mentioned above. The pressure-sensitive pressure relief mechanism is a mechanism that is actuated when an internal pressure of the battery cell 20 reaches a threshold, to relieve internal pressure of the battery cell 20.

In some embodiments, the battery 10 further includes a collection chamber 11b, as shown in FIG. 7 and FIG. 8. The collection chamber 11b in the present application refers to a chamber that collects emissions from the battery cell 20 and the thermal management component 13 when the pressure relief mechanism 213 is actuated. The collection chamber 11b is configured to collect emissions, and may be sealed or unsealed. In some embodiments, the collection chamber 11b may contain air or another gas. Optionally, the collection chamber 11b may also contain a liquid, such as a cooling medium, or a component for accommodating the liquid is provided to further lower the temperature of the emissions entering the collection chamber 11b. Further, optionally, the gas or liquid in the collection chamber 11b flows in a circulating manner. In the case that there is the avoidance chamber 134a as described above, the avoidance chamber 134a may be isolated from the collection chamber 11b by the thermal management component 13. The so-called "isolation" here refers to separation, which may refer to unsealing. This situation could be more conducive to breakthrough of the avoidance side wall 134c by the emissions to allow the fluid to flow out, so as to further lower the temperature of the emissions and extinguish them, thereby improving safety performance of the battery. In addition, in the case that the avoidance structure 134 is a through hole described above, the avoidance chamber 134a and the collection chamber 11b may be in communication with each other. This manner is more conducive to discharge of the emissions, thereby avoiding safety hazards caused by secondary high pressure.

In some embodiments, the collection chamber 11b may also be an open cavity outside the thermal management component 13. For example, in an embodiment that the thermal management component 13 serves as a bottom portion 112a of the case shell 112 of the case 11, the emissions from the battery cell 20 may be directly discharged to an outer space of the thermal management component 13, that is, the outside of the case 11, after passing through the thermal management component 13, thereby avoiding generation of secondary high pressure. In some alternative embodiments, the battery 10 may further include a protective member 115, as shown in FIG. 7. The protective member 115 in the present application refers to a component that is arranged on a side of the thermal management component 13 away from the battery cell 20 to provide protection for the thermal management component 13 and the battery cell 20. In these embodiments, the collection chamber 11b may be arranged between the protective member 115 and the thermal management component 13.

In some embodiments, the protective member 115 may be a portion that is installed at the bottom of the case 11 to play a protective role. This manner helps to promote more diversified designs of an application position or space for the battery 10 such as an electric vehicle. For example, for some electric vehicles, in order to reduce manufacture costs and further reduce a price of a final product, the protective member 115 may not be provided without affecting the usage. A user can choose whether to install a protective member according to needs. In this case, the collection chamber 11b constitutes an open cavity mentioned above, and the emissions from the battery cell 20 may be directly discharged to the outside of the battery 10.

In some embodiments, the protective member 115 may be the bottom portion 112a of the case shell 112 of the case 11. For example, the thermal management component 13 may be assembled to the protective member 115 that serves as the bottom portion 112a of the case shell 112, and the thermal management component 13 is assembled to the protective member 115 with a gap therebetween to form the collection chamber 11b. For example, in some embodiments, the protective member 115 includes a concave chamber having an opening toward the thermal management component 13 to form the collection chamber 11b. In this case, the collection chamber 11b may serve as a buffer chamber for the emissions from the battery cell 20. When at least one of the temperature, volume, or pressure of the emissions in the collection chamber 11b reaches a predetermined level or threshold, the protective member 115 may be partially damaged to relieve the pressure in the collection chamber 11b in time. In some alternative embodiments, alternatively or additionally, a sealing member (such as a sealing ring, a sealant, or the like) may be provided between the protective member 115 and the thermal management component 13 to seal the collection chamber 11b, where the sealing member may also be at least partially damaged when at least one of the temperature, volume, or pressure of the emissions in the collection chamber 11b reaches a predetermined level or threshold, to relieve the pressure in the collection chamber 11b in time, thereby avoiding causing secondary damage.

In some alternative embodiments, the protective member 115 may also be integrally formed with the thermal management component 13. For example, on the outside of the thermal management component 13, a protective member 115 is also integrally formed, and there is a space between the protective member 115 and the thermal management component 13 to form the collection chamber 11b. The protective member 15 may be provided with a weakened structure, so that the protective member 115 may be partially damaged when the temperature, volume or pressure of the emissions in the collection chamber 11b reaches a predetermined level or threshold, to relieve the pressure of the collection chamber 11b in time. This manner could further reduce the number of components, and therefore reduce assembly time and assembly costs.

Additionally or as an alternative solution, in some embodiments, the collection chamber 11b may be constituted by a beam 114 (see FIG. 3) arranged to extend between the cover body 111 and the case shell 112. The thermal management component 13 may be arranged between the beam 114 and the battery cell 20. In some embodiments, the beam 114 may have a hollow structure, and the hollow space of the beam 114 may constitute the collection chamber 11b.

Figure 10:
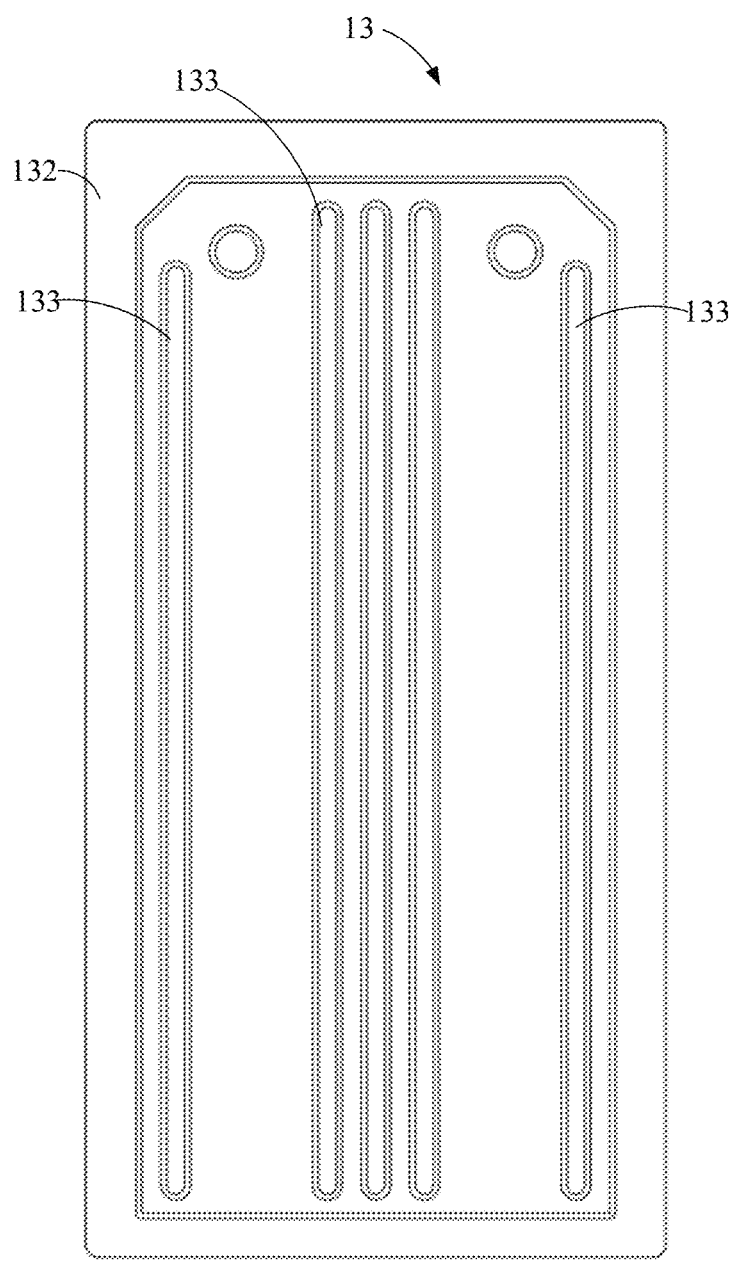
FIG. 10 shows a bottom view of the thermal management component shown in FIG. 9.
Figure 11:
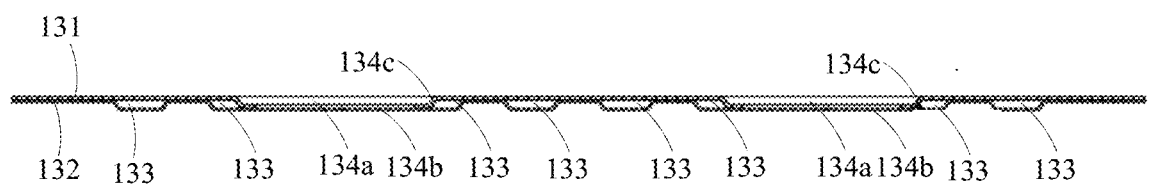
FIG. 11 shows a sectional view of the thermal management component shown in FIG. 9 in a direction of A-A.

FIGS. 9 to 11 respectively show views at different angles and a sectional view of a thermal management component 13 according to some embodiments of the present application. As shown in the figures, in some embodiments, a half-recess structure corresponding to a flow channel 13 may be formed on the first thermally conductive plate 131 and the second thermally conductive plate 132, respectively, and the half-recess structures of the first thermally conductive plate 131 and the second thermally conductive plate 132 are aligned with each other. By assembling the first thermally conductive plate 131 and the second thermally conductive plate 132 together, the half-recess structures of the first thermally conductive plate 131 and the second thermally conductive plate 132 are combined into the flow channel 133, and finally the thermal management component 13 is formed.

Certainly, it should be understood that the specific structure of the thermal management component 13 described above is only illustrative, and is not intended to limit the protection scope of the present application. Any other suitable structure or arrangement is also possible. For example, in some alternative embodiments, at least one of the first thermally conductive plate 131, the second thermally conductive plate 132, and the flow channel 133 may be omitted. For example, the second thermally conductive plate 132 may be omitted. In other words, in some embodiments, the thermal management component 13 may only include the first thermally conductive plate 131 and the flow channel 133 arranged on one side or embedded therein.

As can be seen from the above description, in some embodiments, in a case that the pressure relief mechanism 213 is arranged on a different side with respect to the bus component 12 of the battery cell 20, a double-chamber structure may be formed after structural adjustment. The double chambers refer to the avoidance chamber 134a between the pressure relief mechanism 213 of the battery cell 20 and the avoidance structure 134 and the collection chamber 11b mentioned above. The double-chamber structure could effectively ensure that the emissions from the battery cell 20 can be discharged in a controllable, orderly and timely manner when the pressure relief mechanism 213 is actuated. In addition, in some embodiments, the avoidance chamber 134a may also be damaged to allow the fluid in the thermal management component 13 to flow out, cooling and extinguishing the emissions from the battery cell 20, so that the temperature of the emissions from the battery cell 20 may be quickly reduced, thereby improving safety performance of the battery 10.

In addition, by arranging the pressure relief mechanism 213 on a different side from the bus component 12 of the battery cell 20, the emissions from the battery cell 20 does not enter the electrical chamber 11a formed from the case 11 or enters the electrical chamber 11a formed from the case 11 in a small amount. This is particularly advantageous for ensuring electrical safety and avoiding short circuits among bus components 12. Based on a structure that the electrical chamber 11a is separate from the double-chamber structure mentioned above, the cover body 111 of the case 11 may be designed to be closer to the bus component 12. The reason is that the emissions from the battery cell 20 are discharged into the avoidance chamber 134a and/or the collection chamber 11b, and the electrical chamber 11a may not need to be provided with a channel for emission flow, so that the cover body 111 can be closer to the bus component 12, even in contact with the bus component 12. This can make the upper structure of the battery 10 more compact, and increase an effective space of the battery 10 for accommodating the battery cells 20, thereby improving volume energy density of the battery 10.

Specifically, in a conventional battery 10, especially in a case that a battery cell 20 adopts a ternary lithium ion battery cell, it is basically impossible to achieve that a distance between a cover body 111 and a bus component 12 is set to be less than 7 mm, let alone the contact between the cover body 111 and the bus component 12. The reason is that for a conventional battery cell 20, since a bus component 12 and a pressure relief mechanism 213 are both provided on the same side of the battery cell 20, in order to ensure that the pressure relief mechanism 213 can be normally enabled and emissions from the battery cell 20 can be discharged and flow smoothly when the pressure relief mechanism 213 is actuated, a distance between the bus component 12 and a cover body 111 is usually set to be 7 mm or above to ensure safety of the battery 10.

Unlike the conventional battery 10, after the pressure relief mechanism 213 and the bus component 12 are provided on different sides of the battery cell 20, since the emissions from the battery cell 20 are discharged into the avoidance chamber 134a and/or the collection chamber 11b, there is no need to reserve a position required for provision of the pressure relief mechanism 213 on the cover plate 212 of the battery cell 20, and the electrical chamber 11a may not need to be provided with a channel for emission flow, so that the cover body 111 and the bus component 12 may be arranged adjacent to each other and a distance between the two may be less than 2 mm. A gap in this size is quite beneficial to the development of battery technology. Specifically, with the development of battery technology up to the present, in a case of ensuring safety, it is very difficult for the battery 10 to reduce a size occupied by each structure and component except the space for accommodating the battery cells 20 by 1 mm. Therefore, the pressure relief mechanism 213 and the bus component 12 are provided on different sides of the battery cell 20, which could significantly improve compactness of the structure of the battery 10, reasonably increase an effective accommodation space for the battery cells 20, thereby improving volume energy density of the battery 10.

The battery of the embodiments of the present application is described above with reference to FIGS. 1 to 11, and a method and device for producing a battery of embodiments of the present application will be described below with reference to FIGS. 12 and 13, and parts that are not described in detail may refer to the foregoing embodiments.

Figure 12:
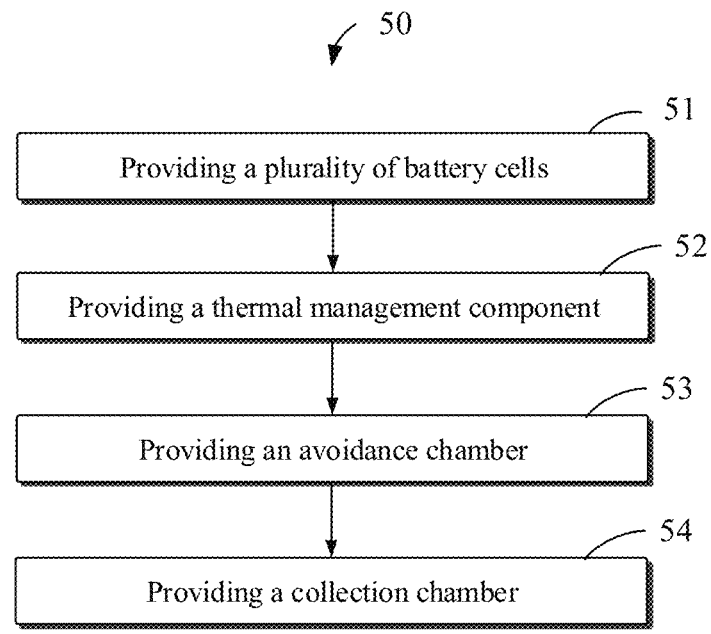
FIG. 12 shows a schematic flow chart of some embodiments of a method for producing a battery according to the present application.

With reference to FIG. 12, according to an implementation manner of the present application, a method 50 for producing a battery is provided, including: a step 51 of providing a battery cell, the batter cell including a pressure relief mechanism, the pressure relief mechanism being configured to be actuated when an internal pressure of the battery cell reaches a threshold, to relieve the internal pressure; a step 52 of providing a thermal management component, the thermal management component being configured to accommodate a fluid to lower a temperature of the battery cell; a step 53 of providing an avoidance chamber, the avoidance chamber being formed between the pressure relief mechanism and the thermal management component, and the avoidance chamber being configured to provide a space allowing the pressure relief mechanism to be actuated; and a step 54 of providing a collection chamber, the collection chamber being located on an outer side of the avoidance chamber for collecting emissions from the battery cell 20 when the pressure relief mechanism is actuated. The thermal management component is configured such that emissions of the battery cell are capable of passing through the thermal management component when the pressure relief mechanism is actuated, and then entering the collection chamber through the avoidance chamber.

Figure 13:
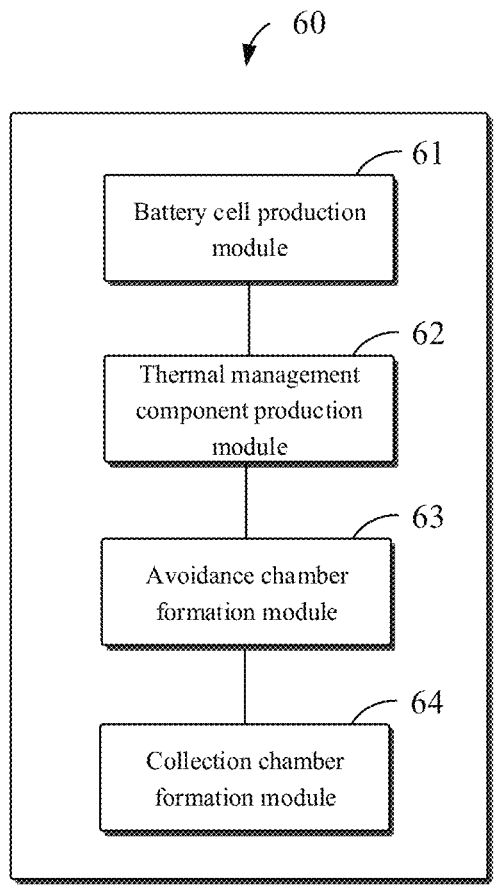
FIG. 13 shows a schematic structural diagram of some embodiments of a device for producing a battery in the present application.

With reference to FIG. 13, in an implementation manner provided in the present application, a device 60 for producing a battery is further provided, including: a battery cell production module 61 configured to produce a plurality of battery cells, at least one battery cell of the plurality of battery cells including a pressure relief mechanism, the pressure relief mechanism being configured to be actuated when an internal pressure of the at least one battery cell reaches a threshold, to relieve the internal pressure; a thermal management component production module 62 configured to produce a thermal management component, the thermal management component being configured to accommodate a fluid to lower a temperature of the battery cell; an avoidance chamber formation module 63 configured to form an avoidance chamber, the avoidance chamber being formed between the pressure relief mechanism and the thermal management component, and the avoidance chamber being configured to provide a space allowing the pressure relief mechanism to be actuated; and a collection chamber formation module 64 configured to form a collection chamber, the collection chamber being located on an outer side of the avoidance chamber for collecting emissions from the battery cell when the pressure relief mechanism is actuated. The thermal management component is configured such that emissions of the battery cell are capable of passing through the thermal management component when the pressure relief mechanism is actuated, and then entering the collection chamber through the avoidance chamber.

According to a battery and a related apparatus, production method and production device therefor of the embodiments of the present application, a pressure relief mechanism is provided on a battery cell, and an avoidance chamber and a connection chamber are provided on an outer side of the battery cell. Provision of the avoidance chamber could leave a certain space for actuation of the pressure relief mechanism. Therefore, due to the provision of the avoidance chamber, the pressure relief mechanism may do not need to be provided on a side of an electrode terminal of the battery cell, and may be selectively provided on another side of the battery cell; and provision of the collection chamber could allow emissions relieved by the pressure relief mechanism to be collected without being sprayed or flowing to the outside, thereby not causing pollution to other components or the external environment. The solutions provided in the present application could provide a variety of possibilities for the setting of the battery, which is especially helpful to further optimizing various settings of the battery and various settings related to the pressure relief mechanism, thereby improving comprehensive performance of the battery.

It should finally be noted that the above embodiments are merely intended for describing rather than limiting the technical solutions of the present application. Although the present application is described in detail with reference to the foregoing embodiments, those of ordinary skill in the art should understand that they may still make modifications to the technical solutions described in the foregoing embodiments, or make equivalent substitutions to some of the technical features therein, but these modifications or substitutions can be made to the respective technical solutions without departing from the spirit and scope of the technical solutions of the embodiments of the present application.

What is claimed is:

1. A battery, comprising:
   a battery cell comprising a pressure relief mechanism, the pressure relief mechanism being configured to be actuated when an internal pressure or temperature of the battery cell reaches a threshold, to relieve the internal pressure;
   a thermal management component configured to accommodate a fluid to adjust a temperature of the battery cell;
   an avoidance chamber formed between the pressure relief mechanism and the thermal management component, the avoidance chamber being configured to provide a space allowing the pressure relief mechanism to be actuated; and
   a collection chamber located on an outer side of the avoidance chamber for collecting emissions from the battery cell when the pressure relief mechanism is actuated,
   wherein the thermal management component is configured such that emissions of the battery cell are capable of passing through the thermal management component when the pressure relief mechanism is actuated, and then entering the collection chamber through the avoidance chamber;
   wherein the thermal management component is provided between the avoidance chamber and the collection chamber and isolates the avoidance chamber and the collection chamber from each other, and the thermal management component is configured to be capable of being damaged by the emissions of the battery cell, so that the emissions of the battery cell enter the collection chamber from the avoidance chamber.

2. The battery according to claim 1, wherein the thermal management component is provided with a through hole, and the through hole is configured such that the avoidance chamber and the collection chamber are in communication with each other.

3. The battery according to claim 2, wherein the avoidance chamber is formed from the through hole provided on the thermal management component, so that the emissions from the battery cell are capable of directly entering the collection chamber through the through hole when the pressure relief mechanism is actuated.

4. The battery according to claim 2, wherein the thermal management component is internally provided with a flow channel for fluid flow, wherein the avoidance chamber is configured to be surrounded by the flow channel.

5. The battery according to claim 4, wherein the flow channel is configured to remain intact in a process of the emissions of the battery cell flowing through the thermal management component.

6. The battery according to claim 4, wherein the thermal management component is configured such that the emissions of the battery cell are capable of damaging a wall of the flow channel, so that the flow channel is in communication with the avoidance chamber.

7. The battery according to claim 1, wherein the avoidance chamber is formed from an avoidance structure of the thermal management component that is open toward the pressure relief mechanism, and the avoidance structure comprises an avoidance side wall surrounding the avoidance chamber.

8. The battery according to claim 7, wherein the avoidance chamber is formed from an avoidance structure of the thermal management component that is open toward the pressure relief mechanism, the avoidance structure comprises an avoidance side wall surrounding the avoidance chamber, and the avoidance side wall is configured to be damaged when the pressure relief mechanism is actuated, so that the fluid flows out.

9. The battery according to claim 8, wherein the avoidance side wall is at a predetermined included angle with respect to a direction of the pressure relief mechanism toward the thermal management component, and the predetermined included angle is greater than or equal to 15° and less than or equal to 85°.

10. The battery according to claim 1, wherein the thermal management component is provided with a relief mechanism opposite to the avoidance chamber, and the relief mechanism is configured to be capable of being actuated to release emissions in the avoidance chamber to the collection chamber.

11. The battery according to claim 10, wherein the relief mechanism is configured to be actuated when an internal pressure or temperature in the avoidance chamber reaches a threshold.

12. The battery according to claim 10, wherein the relief mechanism is configured to be actuated when a temperature of the emissions in the avoidance chamber reaches a threshold.

13. The battery according to claim 10, wherein the relief mechanism comprises a weakened structure formed on a wall of the thermal management component.

14. The battery according to claim 1, wherein the battery comprises a case shell configured to accommodate the battery cell, and the thermal management component constitutes at least a portion of the case shell.

15. The battery according to claim 1, wherein the battery further comprises a protective member, and the collection chamber is defined between the thermal management component and the protective member.

16. The battery according to claim 15, wherein the protective member comprises a concave chamber having an opening toward the thermal management component to form the collection chamber.

17. The battery according to claim 15, wherein a sealing member is placed between the protective member and the thermal management component, and the protective member and the thermal management component are firmly engaged by a fastener;
   wherein the sealing member is configured to be damaged when a temperature of the emissions reaches a predetermined temperature, so as to relieve pressure in the collection chamber.

18. An apparatus comprising a battery, the battery being configured to provide electric energy and comprising:
   a battery cell comprising a pressure relief mechanism, the pressure relief mechanism being configured to be actuated when an internal pressure or temperature of the battery cell reaches a threshold, to relieve the internal pressure;
   a thermal management component configured to accommodate a fluid to adjust a temperature of the battery cell;
   an avoidance chamber formed between the pressure relief mechanism and the thermal management component, the avoidance chamber being configured to provide a space allowing the pressure relief mechanism to be actuated; and
   a collection chamber located on an outer side of the avoidance chamber for collecting emissions from the battery cell when the pressure relief mechanism is actuated, wherein the thermal management component is configured such that emissions of the battery cell are capable of passing through the thermal management component when the pressure relief mechanism is actuated, and then entering the collection chamber through the avoidance chamber;

wherein the thermal management component is provided between the avoidance chamber and the collection chamber and isolates the avoidance chamber and the collection chamber from each other, and the thermal management component is configured to be capable of being damaged by the emissions of the battery cell, so that the emissions of the battery cell enter the collection chamber from the avoidance chamber.

* * * * *